United States Patent [19]

le Comte

[11] 4,359,437
[45] Nov. 16, 1982

[54] METHOD AND APPARATUS FOR PRODUCING A THIN-WALLED ARTICLE OF SYNTHETIC RESIN, IN PARTICULAR A LARGE-SIZED ARTICLE

[75] Inventor: Adolf le Comte, New Rochelle, N.Y.

[73] Assignee: Le Comte-Holland B.V., Vianen, Netherlands

[21] Appl. No.: 242,295

[22] Filed: Mar. 10, 1981

[30] Foreign Application Priority Data

Mar. 11, 1980 [NL] Netherlands .......................... 8001450

[51] Int. Cl.³ ................................................ B29C 5/00
[52] U.S. Cl. ..................................... 264/102; 264/511;
264/571; 264/134; 264/136; 264/DIG. 78;
425/504; 425/116; 425/123; 425/405 R;
425/DIG. 60; 425/DIG. 238
[58] Field of Search ..................... 264/102, 45.2, 46.5,
264/46.8, 316, 134–137, 101, 313, DIG. 78,
510–511, 571; 425/504, 116, 123, 405 R, DIG.
238, DIG. 60

[56] References Cited

U.S. PATENT DOCUMENTS

| | | | |
|---|---|---|---|
| 2,863,797 | 12/1958 | Meyer | 264/136 |
| 2,903,389 | 9/1959 | Fujita | 264/102 |
| 2,913,036 | 11/1959 | Smith | 264/102 |
| 3,123,509 | 3/1964 | Toegel | 425/116 |
| 3,250,839 | 5/1966 | De Luca | 264/102 |
| 3,669,589 | 6/1972 | Bordat | 425/116 |
| 3,775,214 | 11/1973 | Winters | 264/102 |

FOREIGN PATENT DOCUMENTS

| | | |
|---|---|---|
| 958429 | 2/1957 | Fed. Rep. of Germany . |
| 1909896 | 9/1970 | Fed. Rep. of Germany . |
| 100058 | 9/1973 | German Democratic Rep. . |
| 125766 | 8/1968 | Netherlands . |
| 944955 | 12/1963 | United Kingdom . |

OTHER PUBLICATIONS

"Wirtschaftliche Fertigung von Grossflächigen GFK-Teilenim Vakuum Injektions-Verfahren," Schik et al., Kunststoff, vol. 21, No. 10, 10–1971.

Primary Examiner—Jeffery R. Thurlow
Attorney, Agent, or Firm—Weingarten, Schurgin, Gagnebin & Hayes

[57] ABSTRACT

A method of manufacturing a thin-walled article of synthetic resin, in particular a large-sized article, while using an inner and an outer template, the synthetic resin being supplied via one or more apertures in one of the two template portions and whereby a partial vacuum is maintained via one or more air discharge apertures downstream of the synthetic resin front.

5 Claims, 1 Drawing Figure

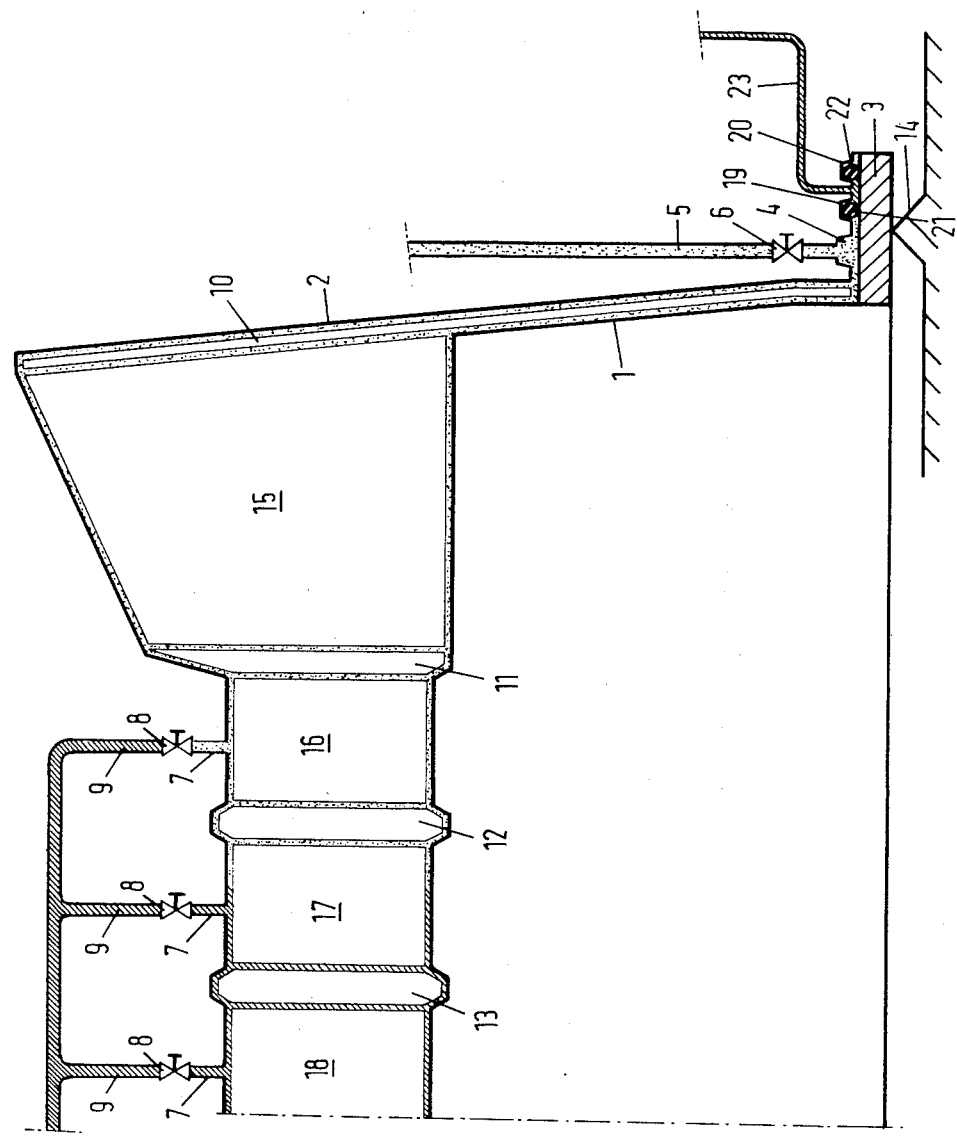

METHOD AND APPARATUS FOR PRODUCING A THIN-WALLED ARTICLE OF SYNTHETIC RESIN, IN PARTICULAR A LARGE-SIZED ARTICLE

The invention relates to a method of producing a thin-walled article of synthetic resin, in particular a large-sized article.

Hitherto it has been impossible to manufacture thin-walled articles, in particular large sized articles: it was only possible to make parts of such large scaled articles, which parts had to be subsequently connected to each other, which naturally adversely affected the price as well as the strength of the entire product.

It is the object of the invention to remove the above drawback.

To this effect use is made in a method of producing a thin-walled article of synthetic resin, in particular a large sized article, of an inner and outer template, while the synthetic resin is supplied to the mould cavity via one or more synthetic resin supply apertures and wherein furthermore a partial vacuum is maintained via one or more air discharge apertures downstream of the synthetic resin front. By a proper adjustment of the synthetic resin supply pressure and of the partial vacuum, a proper, regular supply of plastics in the mould cavity, which is mostly filled with glass fibre, is obtained.

In further elaboration of the invention, in case of stagnation of the synthetic resin passage through the mould cavity, the partial vacuum can be removed and the synthetic resin supply pressure be increased so that at least one of the template portions in the stagnation zone recedes, after which the synthetic resin supply pressure is reduced or removed and the partial vacuum is again produced, whereafter, upon elimination of the stagnation, the original pressure ratios are again restored.

It is possible thereby to maintain a partial vacuum between edge packings for mutually sealing the parts of the template assembly.

The invention furthermore relates to a method of manufacturing a ship's hull or the like article provided with longitudinal and transverse ribs, wherein the carriers made of hard PVC foam and the polyurethane foam plastics fillers provided therebetween are wrapped with alternate layers of glass fibre fabric and glass fibre mat and thus are disposed in the proper sequence between the inner and outer template, whereby via a collecting trough, with which the plastics apertures are in communication, the resin is supplied at an adjustable pressure and whereby a controlled vacuum is provided via exhaust apertures regularly distributed along the surface of one of the two templates and fitted with valves.

The invention also relates to an apparatus for manufacturing a large sized, thin-walled article, e.g. e ship's hull, provided with longitudinal and transverse carriers, i.c. frames, provided with a rigid inner template and a flexible outer template or vice versa, whereby the inner or outer template, in situ of the sealing of outer and inner template relatively to each other, is provided with a collecting trough for the supply of plastics and whereby one or both templates distributed along the surface thereof is provided with a plurality of exhaust apertures, communicating with ducts fitted with valves.

The sealing of the templates relatively to each other may be formed by two sealing rings or the like arranged in substantially parallel relationship relative to each other and accommodated in grooves in one of the templates and the space between the rings may be provided with one or more branches adapted for connection to a vacuum source.

One embodiment of an apparatus according to the invention will now be discussed, by way of example, with reference to the accompanying drawing, wherein a part of a cross-section is shown, likewise describing the method to be performed therewith for manufacturing a ship's hull.

According to the drawing an apparatus for manufacturing ship's hull is provided with a rigid inner template 1 and a flexible outer template 2. At the bottom end i.c. supporting end the inner template terminates in a horizontal foot 3, resting on a plurality of adjusting means 14. By means of said adjusting means a plurality of inner templates, which are arranged transversely to the direction of drawing in tandem relationship, can be aligned. In situ of said foot 3 the outer template 2 is provided with a synthetic resin collecting trough 4 which extends circumferentially along the template. The template trough 4 communicates with a synthetic resin supply duct 5 via which the synthetic resin can be supplied at controlled pressure from a storage vessel, not shown. A valve 6 is incorporated in the synthetic resin supply duct.

Furthermore the outer template is provided with branches 7 regularly distributed along the surface, with which communicate vacuum exhaust ducts 9 fitted with valves 8. If necessary, also the inner template may be provided with said branches. Between the inner and outer template there is provided a plurality of cores 10, 11, 12, 13, consisting of hard PVC foam. The cores 11, 12 and 13 constitute the longitudinal girders. Between the inner and outer template there are provided between said cores 10–13 foam plastic cores 15, 16, 17 and 18, e.g. of polyurethane, affording a high built-in buoyancy to the ship'hull.

As furthermore appears from the drawing, the sealing between the two templates is formed by two sealing rings 21, 22 of e.g. neoprene arranged along the circumference and substantially mutually parallel. The sealing rings are accommodated in grooves 19, 20 of the outer template 2. The part between the grooves is connected to a duct 23 which is connected to a vacuum source, not shown. As a result the two sealing rings, under influence of the vacuum, are each time fixedly drawn in the constriction formed by the groove and the inner wall of the inner template, so that neither supplied synthetic resin can flow away nor air can leak into the space between the two template parts.

Prior to arranging said cores between the two templates, these may be wrapped with alternate layers of glass fibre fabric and glass fibre mat, which serve as reinforcement for the synthetic resin to be supplied. During the supply of synthetic resin after the closure of the template, the mould cavity is brought under partial vacuum by the ducts 9 by opening the valves 8, while simultaneously the valve 6 is opened for supply of the resin. In the drawing the vacuum is shown in hatched lines and the synthetic resin is shown dotted.

It will be clear that as soon as the synthetic resin front has passed a given vacuum branch 7, the respective valve 8 will be closed, in order to prevent synthetic resin from flowing into the vacuum duct.

In the same manner as the introduced cores of hard PVC foam, which serve as longitudinal girders, also cores serving as transverse girders may be disposed between the template parts.

The above described method and apparatus give the possibility to manufacture large sized, thin-walled articles with a random number of longitudinal and transverse girders in a single processing step. The invention therefore is not restricted to the manufacture of the hull of a ship but may also be applied for motor-car bodies, houses or the like.

What I claim is:

1. A method of manufacturing a thin-walled article of synthetic resin, in particular a large-sized article, and using a mold having an inner and outer, shape defining template which define therebetween a cavity for forming said thin-walled article, at least one of said templates being responsive to pressure differentials between said cavity and the external for varying the spacing therebetween, said method comprising the steps of:

establishing a partial vacuum in the cavity between said templates via plural discharge apertures in at least one of said two templates;

supplying synthetic curable resin to said cavity via one or more apertures in at least one of said templates under pressure;

controlling the application of said partial vacuum and synthetic resin supply pressure by increasing said pressure and removing said partial vacuum so that said templates recede from each other in at least a portion thereof whereby a stagnation zone in said cavity between said portions is eliminated; and restoring said partial vacuum and restoring the pressure of the resin supply to the pressure before the increase thereof.

2. The method of claim 1 further including the step of maintaining a separate, partial vacuum in peripheral, sealing portions of said first and second templates, said separate vacuum being isolated from said cavity.

3. The method of claim 1 or 2 further including the step of:

spacing said first and second templates by applying a plurality of structural cores to said cavity prior to the application of said synthetic resin.

4. The method of claim 3 further including the step of wrapping said cores in glass fiber material.

5. Apparatus for manufacturing a large-sized, thin-walled article comprising:

first and second templates positioned to define a cavity therebetween corresponding to the thin-walled article;

said templates having a fixed shape to define the exterior surface of said thin-walled article by the shape of the inner facing surfaces of said templates;

a plurality of cores within said cavity of predetermined structural shapes;

a layer of glass fiber material between said cores and said templates;

means for applying synthetic resin under variable pressure to said cavity;

at least one of said templates being sufficiently flexible in the region of said cores to permit said templates to recede from each other under the influence of pressure applied to said cavity relative to the exterior thereby to facilitate the flow of fluent resin material between said cores and said templates;

means for applying a partial vacuum to said cavity through apertures in at least one of said templates;

means for providing removal of said vacuum between portions of said templates and for elevating the pressure of the supplied synthetic resin to cause said templates to recede from each other in said portion whereby stagnation zones at said portions are eliminated.

* * * * *